United States Patent
Alizadeh et al.

(10) Patent No.: US 12,507,176 B2
(45) Date of Patent: Dec. 23, 2025

(54) INTERFERENCE REDUCTION OR PREVENTION IN COLLOCATED GELOCATION AND WIRELESS CONNECTIVITY SYSTEMS

(71) Applicant: Cisco Technology, Inc., San Jose, CA (US)

(72) Inventors: Ardalan Alizadeh, Milpitas, CA (US); Sivadeep R. Kalavakuru, Akron, OH (US); Peiman Amini, Fremont, CA (US); Vishal S. Desai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 461 days.

(21) Appl. No.: 18/061,927

(22) Filed: Dec. 5, 2022

(65) Prior Publication Data

US 2024/0188000 A1    Jun. 6, 2024

(51) Int. Cl.
*H04W 52/28*    (2009.01)
*H04W 24/08*    (2009.01)
*H04W 52/24*    (2009.01)
*H04W 52/36*    (2009.01)
*H04W 84/12*    (2009.01)

(52) U.S. Cl.
CPC ......... *H04W 52/285* (2013.01); *H04W 24/08* (2013.01); *H04W 52/243* (2013.01); *H04W 52/367* (2013.01); *H04W 84/12* (2013.01)

(58) Field of Classification Search
CPC . H04W 52/285; H04W 24/08; H04W 52/243; H04W 52/367; H04W 84/12
See application file for complete search history.

(56) References Cited

U.S. PATENT DOCUMENTS

| | | | | |
|---|---|---|---|---|
| 5,594,453 | A | * | 1/1997 | Rodal ................... G01S 19/235 342/357.65 |
| 2012/0069766 | A1 | | 3/2012 | Fu et al. |
| 2014/0187249 | A1 | | 7/2014 | Fu et al. |
| 2016/0234748 | A1 | * | 8/2016 | Chrisikos .............. H04L 43/065 |
| 2016/0302209 | A1 | | 10/2016 | Behravan et al. |
| 2017/0188382 | A1 | * | 6/2017 | Wan ..................... H04B 1/0475 |
| 2017/0311312 | A1 | | 10/2017 | Koo et al. |

(Continued)

OTHER PUBLICATIONS

International Telecommunication Union, "Unwanted emissions in the spuriouos domain", <https://www.itu.int/dms_pubrec/itu-r/rec/sm/R-REC-SM.329-12-201209-1 !!PDF-E.pdf>, accessed Nov. 7, 2022. (Year: 2022).*

(Continued)

*Primary Examiner* — Asad M Nawaz
*Assistant Examiner* — Hugh Mark Ashley
(74) *Attorney, Agent, or Firm* — Patterson + Sheridan, LLP

(57) ABSTRACT

Techniques for reducing wireless interference are provided. A wireless local area network (WLAN) is providing, by an access point using a first radio. It is determined to initiate a geolocation process for the access point using a second radio. A first amount of interference at the second radio caused by the first radio is determined, and either a hot start geolocation acquisition process or a cold start geolocation acquisition process is selectively used for the AP based on comparing the first amount of interference to one or more criteria.

20 Claims, 7 Drawing Sheets

(56) References Cited

U.S. PATENT DOCUMENTS

2023/0388826 A1* 11/2023 Akhtar .................. H04W 84/12
2024/0085569 A1* 3/2024 Tang ....................... G01S 19/09

OTHER PUBLICATIONS

Federal Communications Communication, FCC Opens 6 GHz Band to Wi-Fi and Other Unlicensed Uses, Apr. 23, 2020, accessed Nov. 4, 2022, <https://www.fcc.gov/document/fcc-opens-6-ghz-band-wi-fi-and-other-unlicensed-uses>.

Z. Hu, R. Susitaival, Z. Chen, I. -K. Fu, P. Dayal and S. K. Baghel, "Interference avoidance for in-device coexistence in 3GPP LTE-advanced: challenges and solutions," in IEEE Communications Magazine, vol. 50, No. 11, pp. 60-67, Nov. 2012, doi: 10.1109/MCOM.2012.6353683 (Abstract Only).

Septentrio, "GNSS Interference", <https://www.ion.org/gnss/upload/files/2157_Septentrio_GNSS_Interference_A5_LR.pdf> accessed Nov. 7, 2022.

Ublox, "Coexistence of Wlan and GNSS without interference", accessed Nov. 7, 2022, <hhttps://portal.u-blox.com/s/question/0D52p00008HKCx2CAH/coexistence-of-wlan-and-gnss-without-interference>.

Tektronix, "Spectrum Pre-compliance for Wireless LAN Regulatory Testing", <https://download.tek.com/document/2_5%2055W-30065-0%20%20WLAN%20App%20Note.pdf>, accessed Nov. 7, 2022.

International Telecommunication Union, "Unwanted emissions in the spuriouos domain", <https://www.itu.int/dms_pubrec/itu-r/rec/sm/R-REC-SM.329-12-201209-I!!PDF-E.pdf>, accessed Nov. 7, 2022.

Spirent White Paper, "GNSS Jamming", Rev A, May 2020, 14 pgs.

* cited by examiner

INTERFERENCE REDUCTION OR PREVENTION IN COLLOCATED GELOCATION AND WIRELESS CONNECTIVITY SYSTEMS

TECHNICAL FIELD

Embodiments presented in this disclosure generally relate to wireless technology. More specifically, embodiments disclosed herein relate to reducing or preventing interference between collocated wireless systems.

BACKGROUND

In many devices and systems, geolocation technologies, such as global navigation satellite systems (GNSS), are collocated with other wireless connectivity technologies. For example, many wireless access points (APs), which are used to provide connectivity via wireless local area networks (WLANs), can include GNSS receivers, such as using a pluggable dongle or as a built-in component. In some systems, such as automated frequency coordination (AFC) systems, it is often preferred or required to know or report the geolocation of the access points (APs) in order to control power levels and other operations appropriately to reduce or prevent interference with incumbent networks. Additionally, in some systems, APs are configured with GNSS receivers to provide automatic self-locating, enabling improved and highly-accurate location-based services to client devices.

However, APs and other devices with multi-radio architecture (e.g., GNSS radio(s) and WLAN radio(s)) operating (concurrently or non-concurrently) in shared or overlapping bands (e.g., 2.4 GHz or 5 GHZ) can inadvertently cause spurious emissions that may be in-band (or near) to the GNSS receiver's frequencies (e.g., L-band frequencies), leading to degraded carrier-to-noise ratio and increased interference and error. In some systems, the close proximity of the GNSS antenna(s) to the WiFi antenna(s), which often transmit at high duty cycles and high power, poses a substantial interference challenge to the GNSS systems.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
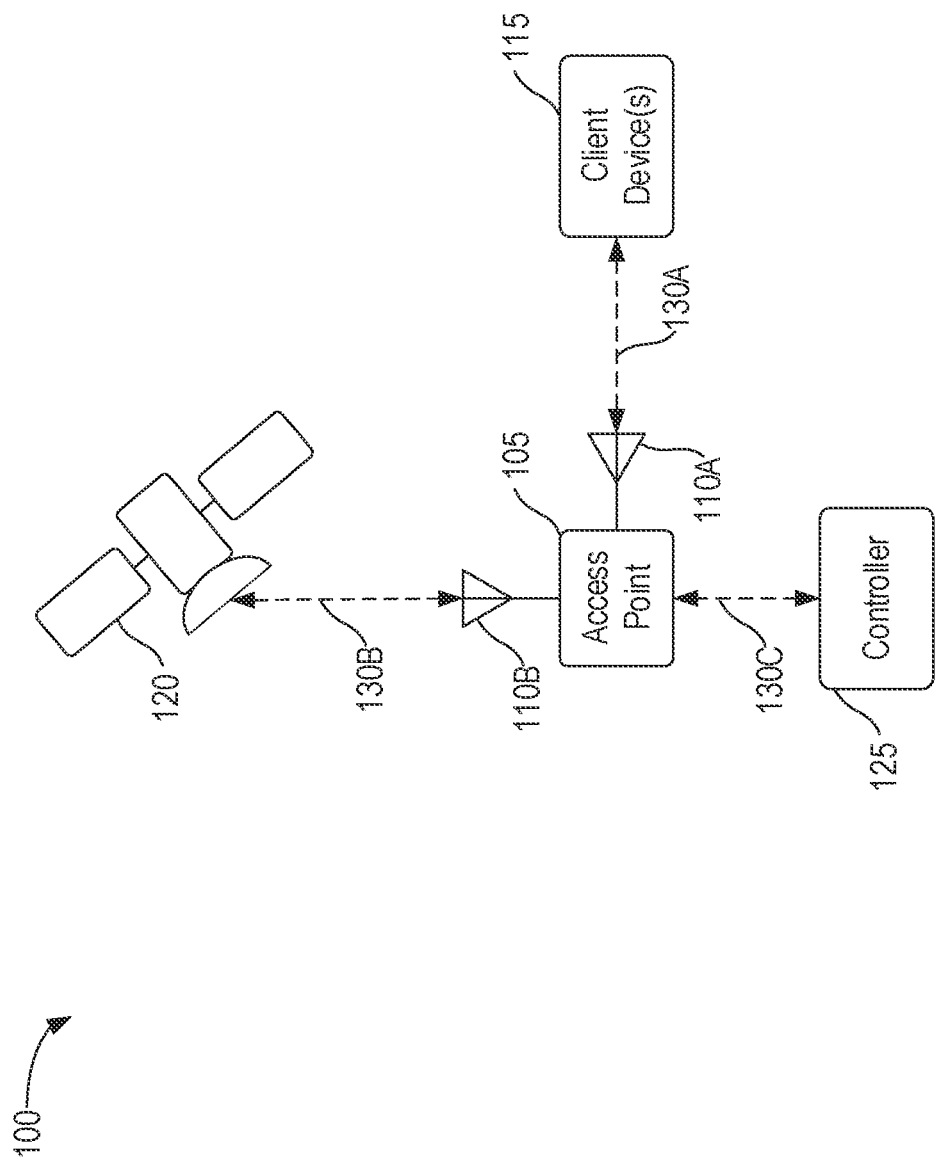
FIG. 1 depicts an example environment for interference reduction and prevention between geolocation systems and wireless communication systems, according to one embodiment.

One embodiment presented in this disclosure provides a method, comprising: providing, by an access point (AP), a wireless local area network (WLAN) using a first radio; determining to initiate a geolocation process for the AP using a second radio; determining a first amount of interference at the second radio caused by the first radio; and selectively using either a hot start geolocation acquisition process or a cold start geolocation acquisition process for the AP based on comparing the first amount of interference to one or more criteria.

Other embodiments in this disclosure provide non-transitory computer-readable mediums containing computer program code that, when executed by operation of one or more computer processors, performs operations in accordance with one or more of the above methods, as well as systems comprising one or more computer processors and one or more memories containing one or more programs which, when executed by the one or more computer processors, performs an operation in accordance with one or more of the above methods.

Example Embodiments

In embodiments of the present disclosure, various techniques and operations are provided to reduce or eliminate interference to geolocation systems (e.g., GNSS radios) caused by other wireless systems (e.g., WiFi or other WLANs). In some embodiments, non-collaborative techniques can be used, which generally involve controlling or modifying the operations of the geolocation system(s) without controlling or modifying the operations of the wireless communication system(s). For example, the system may selectively use the geolocation operations at different times or use different techniques (e.g., hot start operations, as opposed to cold start operations) to avoid or reduce the interference to the geolocation system from the wireless communication system. In some embodiments, collaborative techniques can additionally or alternatively be used, which generally involve controlling or modifying the operations of the wireless communication system(s). For example, the system may use adaptive power management or need-based client steering to reduce the interference to the geolocation system from the wireless communication system.

In some embodiments, the system can use a wireless communication-based acquisition scheduling (e.g., performing geolocation acquisition based on the state of the wireless communications). Generally, to perform geolocation acquisition operations or processes (e.g., to acquire the signal and determine the initial position of the receiver), systems can use various techniques such as cold start or hot start acquisition. As used herein, the time to first fix (TTFF) refers to the time taken by the GNSS or other geolocation receiver to acquire the signals and perform the initial position fix. Additionally, the term acquisition sensitivity refers to the minimum received power level at which such a first fix can occur. In an embodiment, the cold start acquisition sensitivity can generally be higher (e.g., about −148 dBm) as compared to hot start acquisition sensitivity (e.g., which can be as low as −163 dBm). That is, the cold start acquisition generally requires less interference, as compared to hot start procedures.

In some embodiments, therefore, the system (e.g., the GNSS acquisition scheduler) can monitor the interference from the wireless system (e.g., the transmitter (Tx) utilization of the radio) to determine whether to use a cold start or a hot start. In one such embodiment, if the predicted interference (e.g., the Tx utilization) is less than a defined threshold, the system can start the acquisition using a cold start process. If the criteria are not met, the receiver may take various actions, such as waiting to perform the acquisition until the Tx utilization reduces (or passes a maximum amount and begins to decline). In some embodiments, the system may alternatively perform assisted hot start acquisition when the utilization is high (or when a defined maximum duration of the wait time is reached).

In an embodiment, the sensitivity of geolocation tracking is lower (e.g., about −165 dBm), such that tracking is relatively more robust than acquisition. However, the accuracy of the positioning may still depend on the carrier-to-noise ratio (sometimes referred to as the carrier-to-noise density ratio and/or carrier-to-noise power density, and often abbreviated C/N0) achieved in this phase of reception. In one embodiment, the carrier-to-noise ratio of the GNSS may be monitored, along with the transmitter duty cycles of the wireless communication system(s). In some embodiments, if the carrier-to-noise signal ratio and/or the residual error of the geolocation estimates is degrading over time, the system can determine whether accuracy degradation is correlated with the transmitter utilization. If so, the wireless transmitter may be causing the issues. In some embodiments, therefore, the system can dynamically initiate a hot reset process to reprocess the search for the satellites.

In some embodiments, the system may use dynamic adaptive power management to reduce interference. As discussed above and in more detail below, the transmit power of the wireless radios (e.g., 2.4 GHz or 5 GHz radios) can have a direct impact on the accuracy or interference of the geolocation receiver. Generally, as the power of the radio frequency (RF) signal increases, so too does interference, and there is a point at which the carrier-to-noise ratio of the signals received by the geolocation system drops beyond a threshold (e.g., by greater than 1 dB). In some cases, until this threshold is reached, there may be little or no measurable effect on the Horizontal Positioning Error (HPE) of the receiver.

In some embodiments, therefore, the system can monitor and/or detect lower-than-expected carrier-to-noise ratios on the geolocation system. For example, the system may determine and save or store the highest or average carrier-to-noise value seen during one or more GNSS messages (e.g., the highest or average during a defined window, such as the last hour, the last day, and the like). The system can then compare the current value(s) with the stored value(s). If the current carrier-to-noise ratio drops below a threshold (e.g., 1 dB lower) than the maximum (or averaged) value, the controller may reduce the transmit power of the wireless communication system by a defined amount (e.g., by 3 dB). In some embodiments, the impact of this reduction can be monitored and adaptively changed based on the ongoing carrier-to-noise ratios. For example, the system may iteratively lower the power by a set amount, re-evaluate the interference, and determine whether to further lower the transmit power.

In at least one embodiment, in order to minimize or reduce the impact of such adaptive power reduction on the performance of the network, the system may optionally modify other configurations, such as by increasing the antenna beamwidth of the communication systems or antenna (if supported) to provide the same or a similar cell size in each power step. In such an embodiment, the downlink signal-to-noise (SNR) and/or modulation coding scheme (MCS) may be lower for some period of time, but the collaborative power management may not impose any substantive interruption to the network. Additionally, in some embodiments, a defined maximum power reduction amount and/or time can be used to ensure that the geolocation operations do not compromise the performance of the network by lowering the power by more than a defined amount and/or for more than a defined duration (e.g., 5 to 10 minutes).

In some embodiments, the system may perform need-based client steering to improve the geolocation process. For example, in one such embodiment, the transmitter duty cycle can be monitored (e.g., overall or on a per-client device basis). In some embodiments, the system can sort the list of current clients (e.g., devices currently connected to the AP) based on their transmitter utilization, and clients may be steered or transferred to neighbor APs (e.g., where one or more clients with high utilization can be steered to other APs to reduce the utilization of the current AP, thereby reducing interference with the geolocation system).

In some embodiments, this neighbor AP selection may be based on current or historical data, such as prior geolocation performance for each AP and/or prior or current utilization on the neighbor AP(s). For example, if there is a neighbor AP that has never had any geolocation fix before (e.g., that does not use geolocation services), it may be a good choice to steer clients to. Additional candidates may include APs with higher carrier-to-noise ratio of the geolocation system, where the higher duty cycle downlink of certain clients moved from the neighbor AP would not cause the interference to exceed a threshold.

As used herein, determining the interference to the geolocation system may include determining or estimating actual or current interference to ongoing geolocation processes (e.g., based on the carrier-to-noise ratio), as well as predicting or estimating what the interference would be if geolocation processes were to begin (e.g., based on the duty cycle or utilization of the wireless communication system(s)). In some embodiments, the system may use any combination of the various techniques described herein to reduce or prevent such interference. For example, in at least one embodiment, the system can initially use non-collaborative methods to improve the geolocation processes, such that the wireless communications are unaffected.

In some embodiments, if such non-collaborative techniques are inadequate (e.g., if a defined period of time has passed and the geolocation process is still hampered by interference), collaborative techniques can be implemented to ensure adequate geolocation accuracy. Additionally, in some embodiments, the systems may use solely non-collaborative processes, solely collaborative processes, or a combination of collaborative and non-collaborative processes.

FIG. 1 depicts an example environment 100 for interference reduction and prevention between geolocation systems and wireless communication systems. As illustrated, an AP 105 having two antenna and/or radios 110 is depicted. For example, the radio 110B may correspond to a geolocation system (e.g., a GNSS receiver), while the radio 110A may correspond to a wireless communication system (e.g., a WiFi radio or other WLAN system). In this way, the AP 105 can provide both geolocation services as well as communication services concurrently or non-concurrently.

In the illustrated example, via the radio 110A, the AP 105 is communicatively linked (as indicated by arrow 130A) to one or more client devices 115. The client devices 115 can generally include any computing device configured to provide wireless communications, such as smartphones, wearable devices, laptop computers, desktop computers, tablets, and the like. Additionally, via the radio 110B, the AP 105 may be linked or may receive signals from one or more satellites 120 (as indicated by arrow 130B). For example, the satellite 120 may be a global positioning system (GPS) or other geolocation service satellite, and the radio 110B may be used to receive and/or transmit GNSS signals that can be used to geolocate the AP 105.

As discussed above, the operations of the radio 110A may cause interference to the operations of the radio 110B. In some embodiments, the AP 105 can therefore use various techniques to prevent or reduce such interference, ensuring adequate and accurate geolocation services. For example, as discussed above and in more detail below, the AP 105 may use non-collaborative methods such as selective or dynamic acquisition processes or dynamic reset processes to enable improved location services with reduced interference. As another example, as discussed above and in more detail below, the AP 105 may use collaborative methods such as adaptive power management or client steering to enable improved location services with reduced interference.

Although a single AP 105 is depicted for conceptual clarity, there may be any number of APs 105 in a given deployment. For example, there may be multiple APs 105 collectively providing one or more wireless networks to client devices 115, and each AP 105 may be configured to perform need-based client steering to neighbor APs. In the illustrated example, the AP 105 is also communicatively linked to a controller 125 (as indicated by arrow 130C). Generally, the AP 105 may be linked to the controller 125 using any suitable technology, including wired or wireless connectivity.

In some embodiments, the controller 125 can additionally or alternatively provide or assist in the interference reduction or prevention operations. In one embodiment, the controller 125 may monitor the APs 105 in the deployment (e.g., their current and/or historical carrier-to-noise ratios, SNRs, utilization, duty cycles, and the like) to enable or improve the need-based client steering. For example, if need-based client steering is used, the AP 105 may query the controller 125 for the list of neighbor APs, the neighbor AP statistics, and/or a set of one or more neighbor APs to which one or more client devices 115 can or should be steered. In some embodiments, however, each AP 105 may perform this analysis locally (e.g., by requesting the information directly from the neighbor APs).

In some embodiments, the controller 125 can be used to enable or improve geolocation acquisition processes. For example, though hot start acquisitions are generally faster and less susceptible to interference than cold start processes, hot start acquisition generally requires some prior knowledge. For example, the hot start may require that the AP 105 already knows its approximate location, the approximate location of the visible satellite(s) 120, predicted or current ephemeris data, and the like. In some embodiments, the controller 125 can maintain this information, and when hot start acquisition is performed, the AP 105 can request or retrieve the relevant data from the controller 125.

Generally, as discussed in more detail below, the AP 105 can use any combination of techniques to reduce interference and improve geolocation services.

Figure 2:
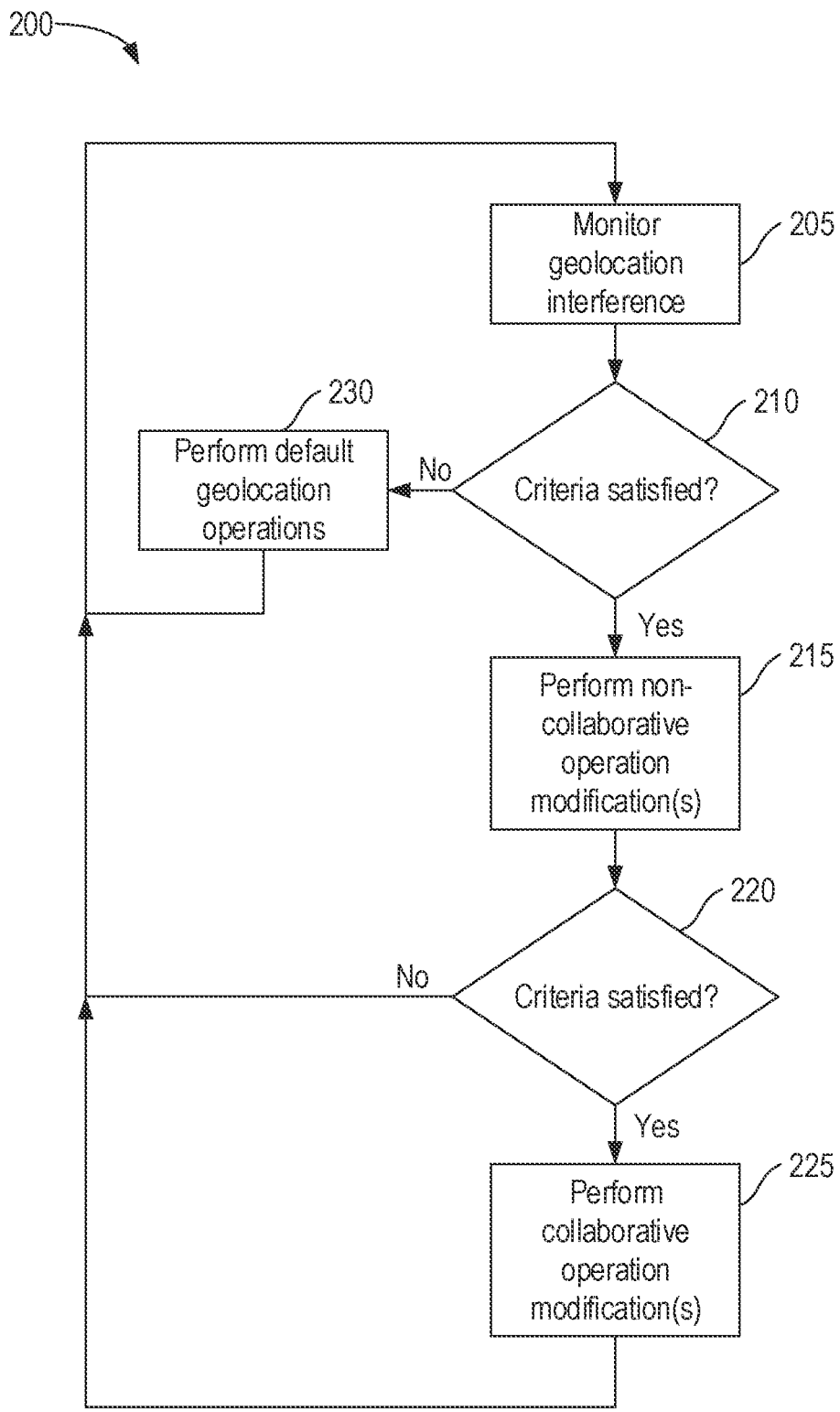
FIG. 2 is a flow diagram depicting an example method for reducing or preventing interference in collocated geolocation and wireless communication systems, according to one embodiment.

FIG. 2 is a flow diagram depicting an example method 200 for reducing or preventing interference in collocated geolocation and wireless communication systems. In some embodiments, the method 200 is performed by an AP, such as AP 105 of FIG. 1.

At block 205, the AP monitors geolocation interference on the AP. That is, the AP monitors, estimates, predicts, or determines the current and/or predicted interference to the geolocation system(s) of the AP, caused by one or more wireless communication system(s) of the AP. For example, as discussed above, the AP may monitor the carrier-to-noise ratio of ongoing geolocation processes, the utilization of the wireless communication systems, the duty cycle of the wireless communication systems, and the like.

In some embodiments, the AP continuously monitors the interference. In some embodiments, the AP only monitors the interference during defined times or according to defined criteria. For example, the AP may monitor the interference when a geolocation process is to be initiated (e.g., prior to performing an acquisition process), when a geolocation process is ongoing (e.g., during a tracking window), and the like. At other times (such as when the geolocation system is idle), the AP may refrain from such processing.

At block 210, the AP determines whether the determined or predicted interference to the geolocation system(s) satisfies one or more defined criteria. In some embodiments, as discussed above, the defined criteria can include a minimum carrier-to-noise ratio, a maximum transmitter utilization or duty cycle, a maximum HPE, and the like. Generally, determining whether the criteria are satisfied can include evaluation of any metric indicative of interference with the geolocation system.

In some aspects, as discussed above, the particular criteria evaluated may differ depending on the current operating state of the geolocation systems. For example, if the system is preparing to initiate an acquisition (e.g., it is not currently transmitting or receiving), the AP may evaluate the wireless communication system's duty cycle and/or utilization. If the geolocation system is currently operation (e.g., in tracking mode), the AP may additionally or alternatively evaluate data such as the carrier-to-noise ratio and/or the HPE.

If, at block 210, the AP determines that the criteria are not satisfied (e.g., the interference is below a threshold), the method 200 continues to block 230, where the AP performs default geolocation operations. That is, because the interference is sufficiently-low, the AP can simply perform its geolocation processes using the default or standard approach of the AP. The method 200 then returns to block 205 to monitor the interference anew (e.g., during the default services, or at the start of a subsequent geolocation process).

If, at block 210, the AP determines that one or more criteria are satisfied, the method 200 continues to block 215, where the AP performs non-collaborative geolocation operation modifications. That is, the AP modifies the ordinary geolocation processes using one or more non-collaborative approaches to reduce or mitigate the effect of interference. For example, the AP may use interference-based acquisition scheduling, tracking maintenance, and the like. One example technique for non-collaborative geolocation processes is discussed below in more detail with reference to FIG. 3.

During and/or after the non-collaborative operations, at block 220, the AP determines whether one or more criteria are satisfied. In embodiments, the criteria evaluated at block 220 may match, correspond to, include, or be included by the criteria evaluated at block 210, or may be different criteria. In some embodiments, at block 220, the criteria relates to whether the ongoing interference remains above a threshold. For example, the AP may determine whether the non-collaborative approach was successful, or whether the geolocation systems are still unable to complete their operations sufficiently. In some embodiments, at block 220, the AP determines whether a defined period of time has passed without being able to complete the geolocation operations.

If the criteria are not satisfied (e.g., if the interference is below the threshold and/or the geolocation operations are proceeding or completed normally), the method 200 can return to block 205 to monitor the interference anew (e.g., during the modified non-collaborative operations, or at the start of the next geolocation process).

If, at block 220, the AP determines that one or more criteria are satisfied (e.g., the interference remains sufficiently-high), the method 200 continues to block 225, where the AP performs collaborative geolocation operation modifications. That is, the AP modifies the ordinary geolocation processes using one or more collaborative approaches (e.g., via modification of the wireless communication processes) to reduce or mitigate the effect of interference. For example, the AP may use adaptive power management, client steering, and the like. Some example techniques for collaborative geolocation processes are discussed below in more detail with reference to FIGS. 4 and 5.

The method 200 then returns to block 205 in order to monitor the interference anew (e.g., during the modified collaborative operations, or at the start of the next geolocation process).

Although the illustrated example depicts a sequential process (e.g., using non-collaborative approaches and only moving to collaborative approaches as needed), in embodiments, the particular combination and ordering of geolocation modifications used may vary. That is, the AP may use both collaborative and non-collaborative approaches in combination simultaneously, may first use collaborative approaches before trying non-collaborative approaches, and the like.

In this way, the AP is able to provide accurate and reliable geolocation services with reduced interference from wireless communication services provided by the AP. This substantially reduces downtime of the geolocation services, improves locationing accuracy, and generally improves the operations of the AP and the broader network or system itself.

Figure 3:
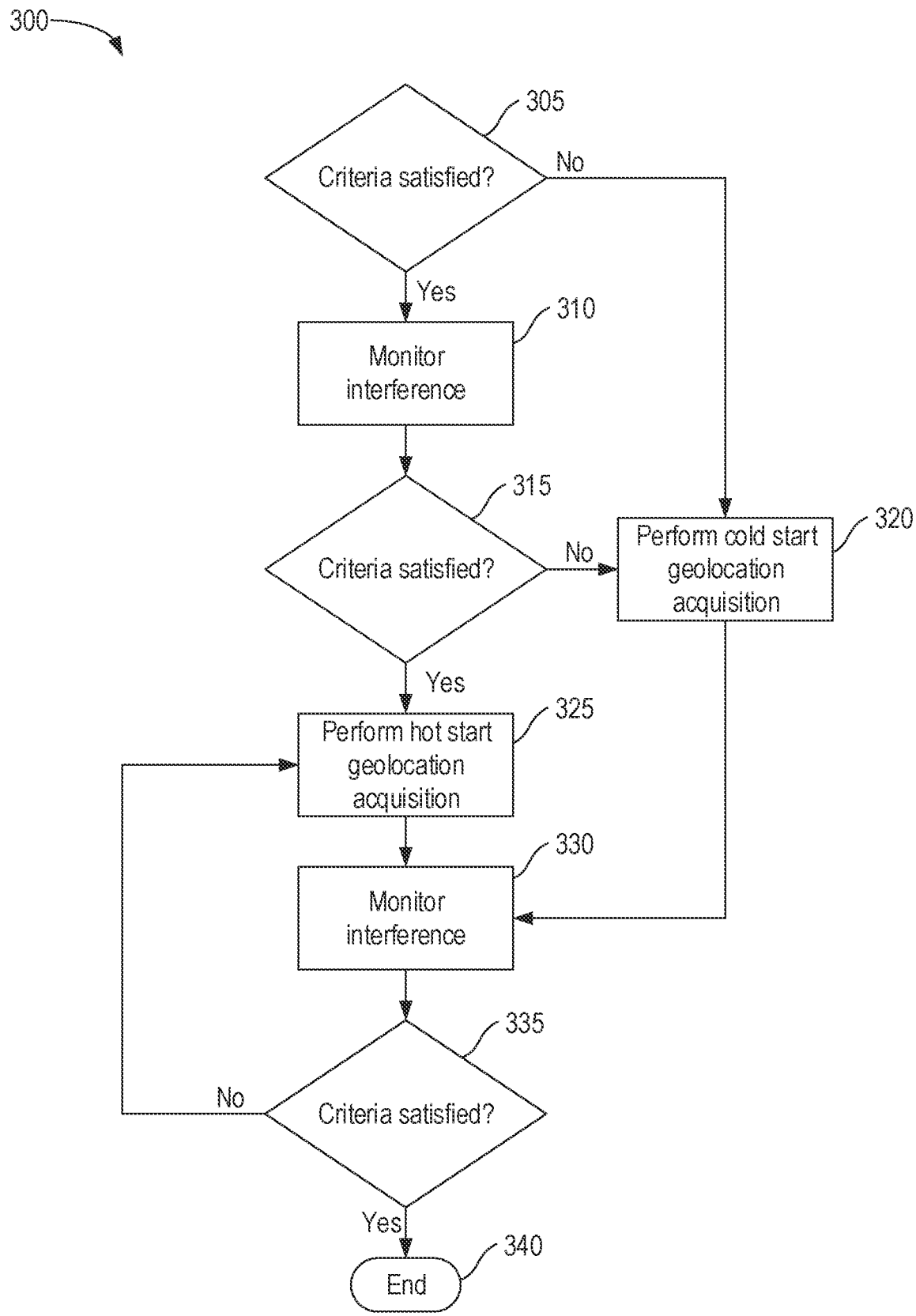
FIG. 3 is a flow diagram depicting an example method for non-collaborative interference prevention or reduction in collocated geolocation and wireless communication systems, according to one embodiment.

FIG. 3 is a flow diagram depicting an example method 300 for non-collaborative interference prevention or reduction in collocated geolocation and wireless communication systems. In some embodiments, the method 300 is performed by an AP, such as AP 105 of FIG. 1. In one embodiment, the method 300 provides additional detail for block 215 of FIG. 2.

At block 305, the AP determines whether one or more criteria are satisfied for interference-based acquisition scheduling. In some embodiments, the evaluation at block 305 corresponds to the evaluation performed at block 210 of FIG. 2. In at least one embodiment, the evaluation includes determining whether the duty cycle and/or utilization of the wireless communication transmissions (e.g., the WiFi radio) meets or exceeds one or more defined threshold(s).

If, at block 305, the AP determines that one or more criteria are not satisfied (e.g., predicted interference is below the threshold), the method 300 continues to block 320, where the AP performs a cold start geolocation acquisition process or operation. As discussed above, a cold start operation generally does not require any prior information about location of the AP, the satellite(s), or any ephemeris data. Accordingly, it may generally have a longer TTFF, as compared to a hot start, and is generally more susceptible to interference, as compared to a hot start. However, because such prior data is not needed, it can be performed reliably and with reduced communication overhead/burden on the AP (e.g., the AP need not request the information from the controller). Once the cold start is completed, the method 300 continues to block 330.

Returning to block 305, if the AP determines that the criteria are satisfied (e.g., the predicted interference exceeds the threshold), the method 300 continues to block 310, where the AP enters a waiting phase and monitors the (predicted) interference, such as by continuing to monitor the duty cycle or transmitter utilization. Once sufficient time has elapsed (e.g., a maximum defined wait time), the method 300 continues to block 315. In some aspects, in addition to or instead of waiting for the maximum time, the AP can wait a shorter period of time, evaluate the interference, and determine whether to continue waiting or to proceed block 315. In some embodiments, in addition to or instead of waiting the maximum duration, the AP can continuously or periodically evaluate the predicted interference, and proceed to block 315 when one or more criteria are met, such as when the predicted interference drops below a threshold, when it begins to decline (e.g., passes its peak), and the like.

At block 315, the AP determines whether one or more criteria are satisfied. Generally, at block 315, the AP determines whether the interference is sufficiently-low such that a cold start acquisition can be used, or if hot-start acquisition is needed. For example, the AP may determine whether the defined maximum time has elapsed without conditions improving enough for a cold start. In at least one embodiment, while performing a cold start process (e.g., if the AP determined, at block 305, that the criteria were not satisfied), the AP may continue to monitor the interference and/or elapsed time. If one or more criteria are satisfied (e.g., a maximum time performing the cold start has been reached without successful fix, the interference has continued or worsened, and the like), the AP may proceed to block 315.

If, at block 315, the AP determines that the criteria are not satisfied (e.g., the interference is sufficiently-low), the method 300 continues to block 320, where the AP performs a cold start geolocation acquisition process, as discussed above. If, at block 315, the AP determines that the criteria are satisfied (e.g., the interference has worsened or remained the same, the maximum duration of time has elapsed, and the like), the method 300 continues to block 325, where the AP performs a hot start geolocation acquisition process.

As discussed above, a hot start operation generally requires or relies on prior information about location of the AP, the satellite(s), and/or the ephemeris data. Accordingly, it may generally have a faster TTFF, as compared to a cold start, but it includes additional transmission overhead, as compared to a cold start. However, because such prior data is used, it can be performed reliably and with increased interference. In one embodiment, to perform the hot start, the AP can access or request any relevant data (e.g., ephemeris data) from another system, such as from the controller of the wireless deployment (e.g., controller 125 of FIG. 1). The AP can then use this data to perform the hot start. Once the hot start is completed, the method 300 continues to block 330.

At block 330, once the initial geolocation fix is secured, the AP monitors the geolocation interference during a tracking phase or operation. For example, the AP may monitor the carrier-to-noise ratio and/or HPE of the geolocation process, the utilization and/or duty cycle of the wireless communication system(s), and the like.

At block 335, the AP determines whether one or more criteria are satisfied. For example, the AP may determine whether the interference remains sufficiently low, whether the HPE remains sufficiently low, whether the utilization and/or duty cycle remain sufficiently low, and the like. Although the illustrated embodiment depicts evaluating the criteria once, in some aspects, the AP continues to evaluate the criteria continuously or periodically during the geolocation tracking operations.

If, at block 335, the AP determines that the interference criteria are not satisfied (e.g., the carrier-to-noise ratio has dropped below a limit or beyond a threshold amount, the HPE has increased beyond a threshold, and the like), the method 300 returns to block 325, where the AP can perform a new hot start to reset the geolocation processes (e.g., to find new satellite(s)). If the criteria are satisfied (e.g., the carrier-to-noise ratio remains high, the HPE remains low, and the like), the AP continues the tracking process until the geolocation processes end, and the method 300 terminates at block 340.

In this way, the AP is able to provide accurate and reliable geolocation services with reduced interference from wireless communication services provided by the AP using non-collaborative and non-disruptive techniques (e.g., without impacting the operations of the wireless communication network). This substantially reduces downtime of the geolocation services, improves locationing accuracy, and generally improves the operations of the AP and the broader network or system itself.

Figure 4:
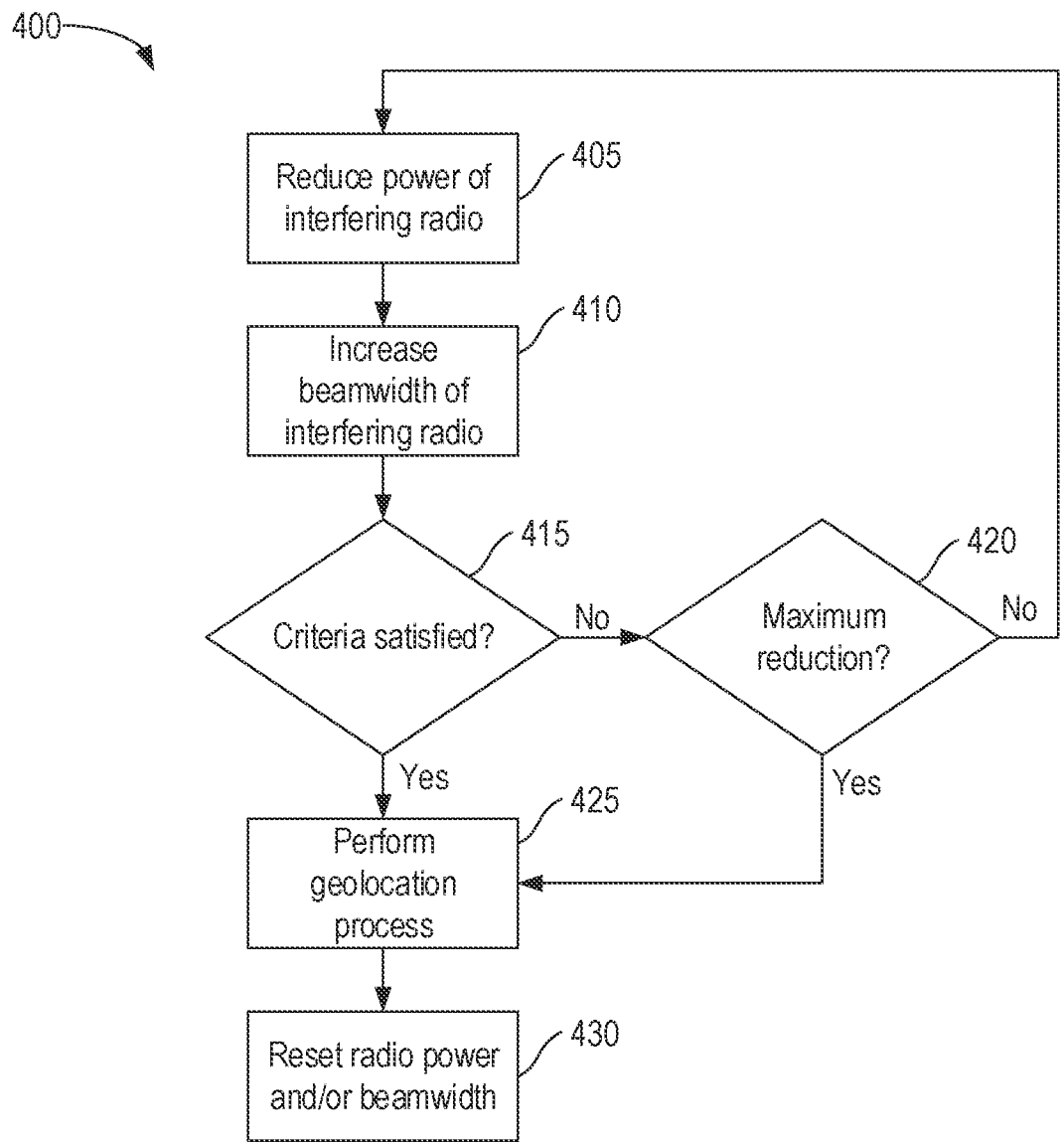
FIG. 4 is a flow diagram depicting an example method for collaborative interference prevention or reduction in collocated geolocation and wireless communication systems using adaptive power management, according to one embodiment.

FIG. 4 is a flow diagram depicting an example method 400 for collaborative interference prevention or reduction in collocated geolocation and wireless communication systems using adaptive power management. In some embodiments, the method 400 is performed by an AP, such as AP 105 of FIG. 1. In one embodiment, the method 400 provides additional detail for block 225 of FIG. 2.

At block 405, the AP reduces a transmission power of one or more radios that are interfering with the geolocation process. For example, the AP may reduce the transmission power of the WLAN radio(s). In some embodiments, the AP reduces the power by a defined amount. For example, the AP may reduce the power by 3 dB.

At block 410, the AP can optionally increase the beamwidth of the interfering radio(s) in order to compensate for the reduced transmission power. Generally, increasing the beamwidth while decreasing the power can allow the coverage of the wireless network to remain relatively stable.

At block 415, the AP determines whether one or more criteria are satisfied. For example, as discussed above, the AP may monitor the current or predicted interference to determine whether it remains above a threshold amount, or if it is below the threshold. If, at block 415, the AP determines that the criteria are not satisfied (e.g., the interference remains high), the method 400 continues to block 420, where the AP determines whether a defined maximum power reduction has been reached. This may include, for example, determining whether the power has been reduced for a threshold duration of time (e.g., more than five minutes) during the geolocation process, whether the power has been reduced below a defined threshold (e.g., below a specified dB, or a specified percentage or ratio of the original power), and the like.

If the maximum reduction has not been reached, the method 400 returns to block 405 to reduce it further. If the AP determines that the maximum reduction has been reached, the method 400 continues to block 425, where the AP attempts to perform the geolocation process without further reducing the power (e.g., using default operations, using non-collaborative operations, or using other collaborative operations such as client steering). Returning to block 415, if the AP determines that the reduced power has caused the criteria to be satisfied (e.g., the interference is below the threshold), the method 400 similarly continues to block 425, where the AP performs the geolocation process(es).

After the geolocation processes are complete (or upon other criteria or events, such as a maximum duration of the power reduction), the method 400 continues to block 430, where the AP resets the interfering radio's power and/or beamwidth to the original settings.

In this way, the AP is able to provide accurate and reliable geolocation services with reduced interference from wireless communication services provided by the AP using collaborative techniques (e.g., reducing the power of the wireless communications without substantially harming the operations of the wireless communication network). This substantially reduces downtime of the geolocation services, improves locationing accuracy, and generally improves the operations of the AP and the broader network or system itself.

Figure 5:
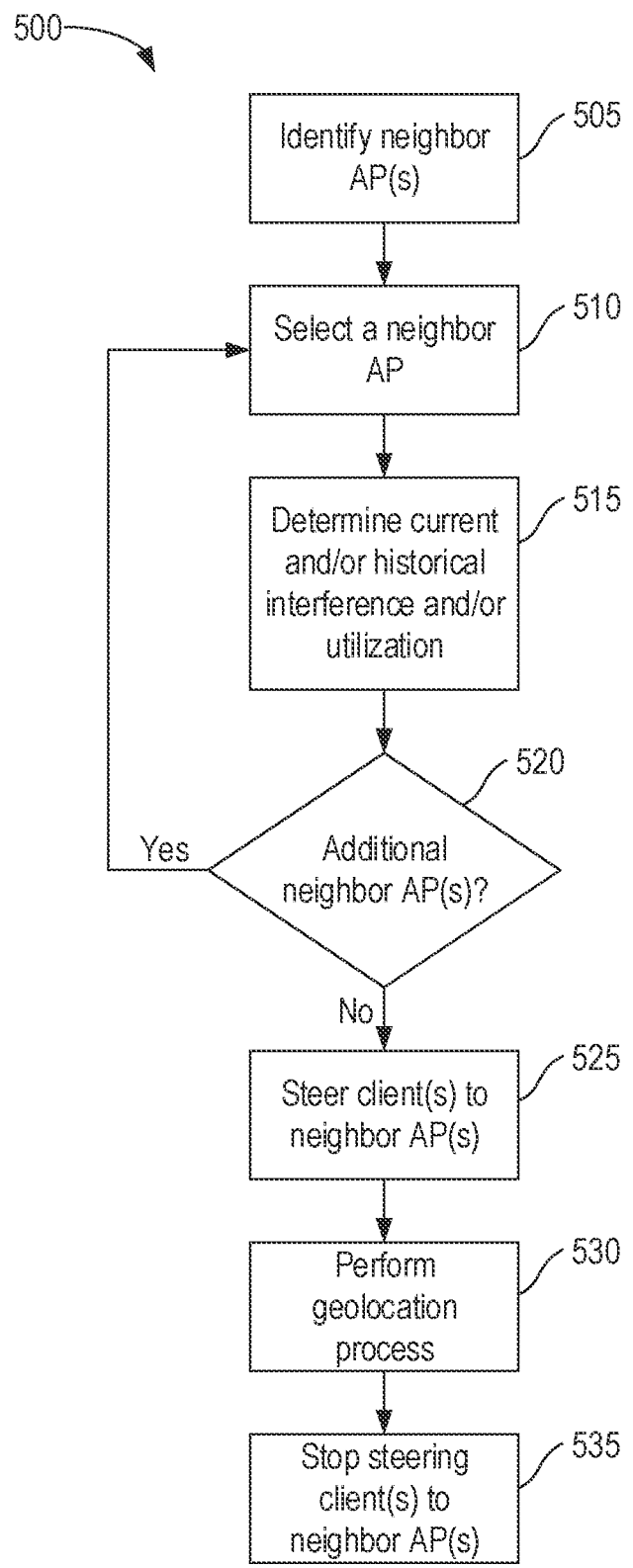
FIG. 5 is a flow diagram depicting an example method for collaborative interference prevention or reduction in collocated geolocation and wireless communication systems using dynamic client steering, according to one embodiment.

FIG. 5 is a flow diagram depicting an example method 500 for collaborative interference prevention or reduction in collocated geolocation and wireless communication systems using dynamic client steering. In some embodiments, the method 500 is performed by an AP, such as AP 105 of FIG. 1. In one embodiment, the method 500 provides additional detail for block 225 of FIG. 2.

At block 505, the AP identifies one or more neighbor APs to which client(s) may be steered or transferred. For example, the AP may use one or more neighbor discovery protocols, may query the controller for the deployment, and the like.

At block 510, the AP selects one of the identified neighbor APs. Generally, the AP can use any suitable technique to select the neighbor AP, including randomly or pseudo-randomly, as each will be evaluated during the method 500. Additionally, though the illustrated example depicts a sequential process for conceptual clarity (selecting and evaluating each neighbor AP in turn), in some aspects, the AP may evaluate some or all of the neighbor APs in parallel. Further, though the illustrated example depicts the AP selecting and evaluating the neighbor AP(s), in some aspects another system (e.g., the controller) may provide an ordered list of neighbor APs, indicating that client(s) should be steered to APs on the list in descending order.

At block 515, the AP determines the current and/or historical interference and/or utilization of the selected neighbor AP. For example, the AP may query the neighbor AP directly, may request the information from the controller, may review the information already-provided by the controller and/or the neighbor, and the like. In some embodiments, the historical data corresponds to the aggregate interference or utilization over a defined window of time, such as the last hour, the last day, and the like.

At block 520, the AP determines whether there is at least one additional neighbor AP that has not-yet been evaluated. If so, the method 500 returns to block 510. If not, the method 500 continues to block 525.

At block 525, the AP can steer one or more client(s) of the AP to one or more of the neighbor APs, based at least in part on the determined current and/or historical interference or utilization data. For example, in one embodiment, the AP identifies a subset of neighbor APs with current interference and/or utilization information below a defined threshold (e.g., that are not currently experiencing geolocation interference), and sorts this subset based on the current information and/or the historical information. The AP can then select one or more neighbor AP(s) having the lowest current interference predictions and/or the lowest historical interference.

At block 525, the AP may similarly select which client(s) to steer to the neighbor AP(s) based on their current utilization levels. For example, the AP may determine the transmitter utilization of each connected client (e.g., the amount of AP time or AP resources each is consuming), and steer one or more of the highest-utilization clients to the neighbor AP(s). As used herein, steering the client generally corresponds to any operations or processes used to transfer the client to the neighbor AP (or to encourage the client to transfer to a neighbor).

At block 530, the AP performs one or more geolocation processes, as discussed above. Because one or more client(s) have been steered to one or more neighbor AP(s), the AP has reduced its current utilization and workload, thereby reducing interference on the geolocation systems and improving (or enabling) their accurate use.

In this way, the AP is able to provide accurate and reliable geolocation services with reduced interference from wireless communication services provided by the AP using collaborative techniques (e.g., steering client devices to other AP(s)). This substantially reduces downtime of the geolocation services, improves locationing accuracy, and generally improves the operations of the AP and the broader network or system itself.

Figure 6:
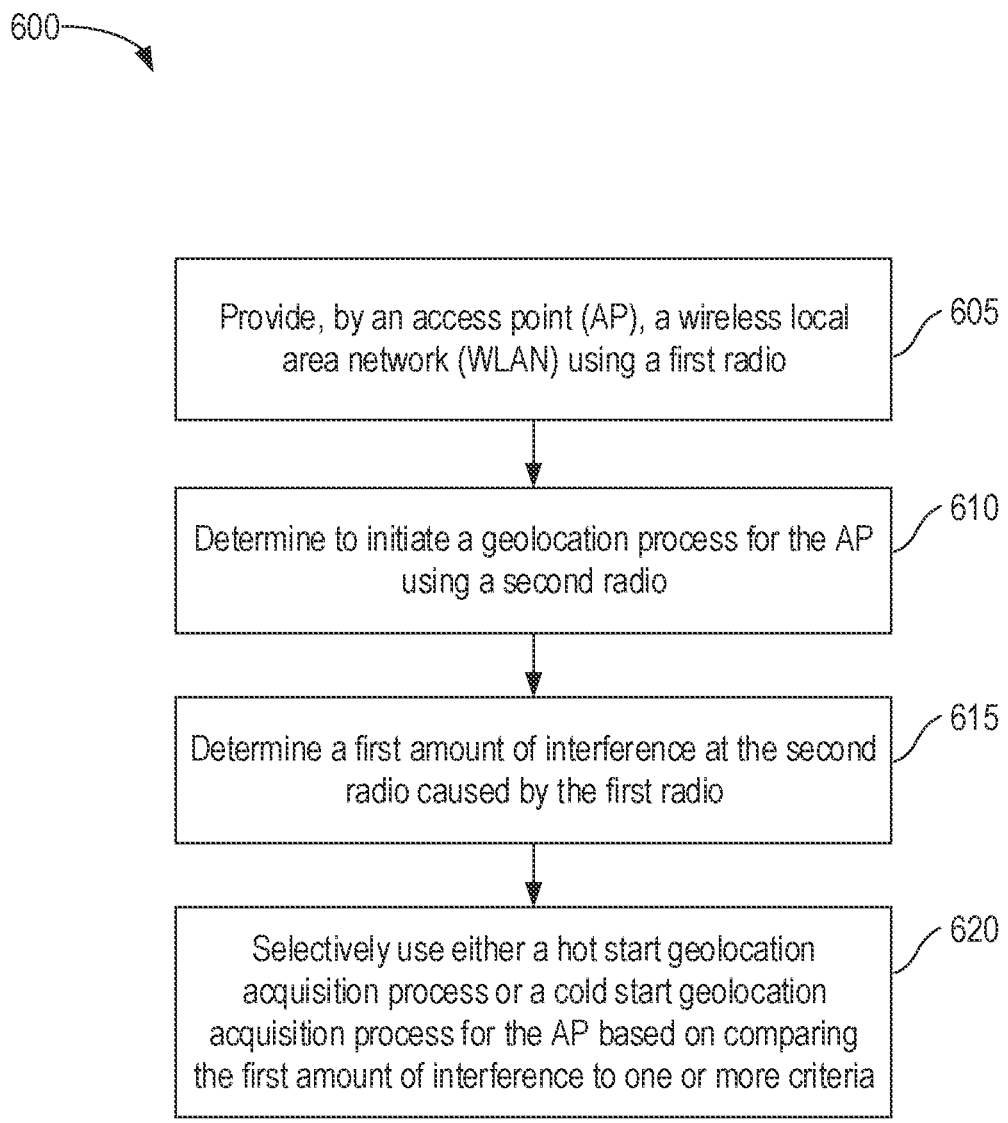
FIG. 6 is a flow diagram depicting an example method for interference prevention or reduction in collocated geolocation and wireless communication systems, according to one embodiment.

FIG. 6 is a flow diagram depicting an example method 600 for interference prevention or reduction in collocated geolocation and wireless communication systems. In some embodiments, the method 600 is performed by an AP, such as AP 105 of FIG. 1.

At block 605, a wireless local area network (WLAN) is provided (e.g., as illustrated by arrow 130A of FIG. 1), by an access point (e.g., AP 105 of FIG. 1), using a first radio (e.g., radio 110A of FIG. 1).

At block 610, it is determined to initiate a geolocation process for the AP using a second radio (e.g., radio 110B of FIG. 1).

At block 615, a first amount of interference at the second radio caused by the first radio is determined.

At block 620, either a hot start geolocation acquisition process or a cold start geolocation acquisition process for the AP is selectively used based on comparing the first amount of interference to one or more criteria.

Figure 7:
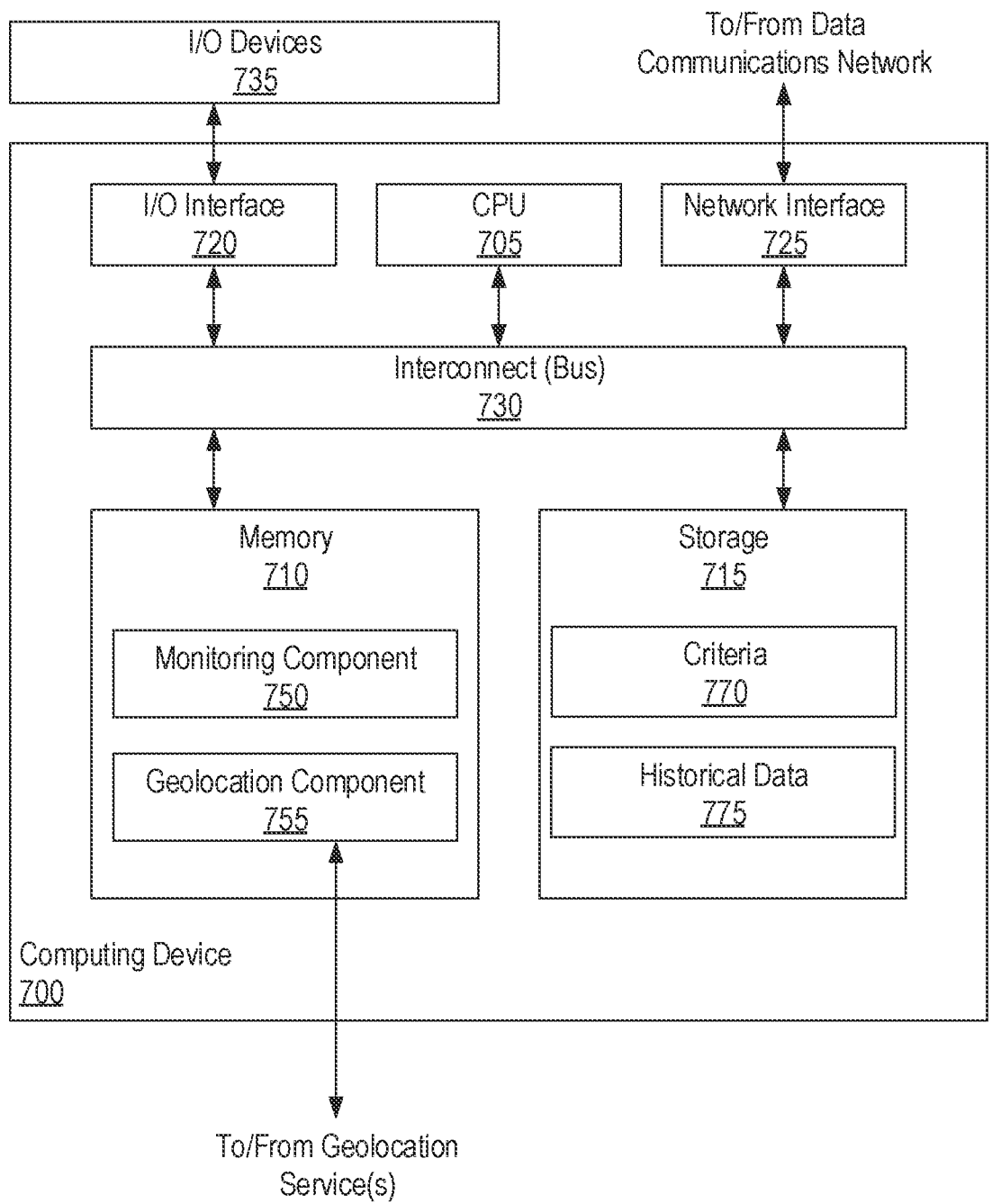
FIG. 7 depicts an example computing device configured to perform various aspects of the present disclosure, according to one embodiment.

FIG. 7 depicts an example computing device 700 configured to perform various aspects of the present disclosure. Although depicted as a physical device, in embodiments, the computing device 700 may be implemented using virtual device(s), and/or across a number of devices (e.g., in a cloud environment). In one embodiment, the computing device 700 corresponds to a wireless AP, such as AP 105 of FIG. 1.

As illustrated, the computing device 700 includes a CPU 705, memory 710, storage 715, a network interface 725, and one or more I/O interfaces 720. In the illustrated embodiment, the CPU 705 retrieves and executes programming instructions stored in memory 710, as well as stores and retrieves application data residing in storage 715. The CPU 705 is generally representative of a single CPU and/or GPU, multiple CPUs and/or GPUs, a single CPU and/or GPU having multiple processing cores, and the like. The memory 710 is generally included to be representative of a random access memory. Storage 715 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 735 (such as keyboards, monitors, etc.) are connected via the I/O interface(s) 720. Further, via the network interface 725, the computing device 700 can be communicatively coupled with one or more other devices and components (e.g., via a network, which may include the Internet, local network(s), and the like). For example, the network interface 725 may correspond to a wireless communications radio (e.g., a WiFi radio) that the computing device 700 uses to provide a wireless network (e.g., a WLAN) for client devices. As illustrated, the CPU 705, memory 710, storage 715, network interface(s) 725, and I/O interface(s) 720 are communicatively coupled by one or more buses 730.

In the illustrated embodiment, the memory 710 includes a monitoring component 750 and a geolocation component 755, which may perform one or more embodiments discussed above. Although depicted as discrete components for conceptual clarity, in embodiments, the operations of the depicted components (and others not illustrated) may be combined or distributed across any number of components. Further, although depicted as software residing in memory 710, in embodiments, the operations of the depicted components (and others not illustrated) may be implemented using hardware, software, or a combination of hardware and software.

In one embodiment, the monitoring component 750 is used to evaluate or predict the current interference, to the geolocation service(s), caused by wireless services. For example, as discussed above, the monitoring component 750 may determine the carrier-to-noise ratio of ongoing geolocation processes, determine the HPE of a geolocation process, determine the utilization or duty cycle of the wireless communications (e.g., of network interface 725), and the like. In some embodiments, the monitoring component 750 further enables or performs various interference mitigation techniques. For example, the monitoring component 750 may control or instruct the operations of the geolocation component 755 (e.g., to use cold start or hot start), may control the operations of the wireless communications (e.g., to reduce transmission power of the network interface 725), to steer clients, and the like.

The geolocation component 755 may generally be used to perform geolocation processes or operations, as discussed above. For example, the geolocation component 755 may correspond to a GNSS receiver, and may be used to determine the geolocation of the computing device 700 (e.g., using cold start acquisitions, hot start acquisitions, and the like). As illustrated, the geolocation component 755 does so via one or more geolocation services (e.g., satellites).

In the illustrated example, the storage 715 includes a set of criteria 770, and historical data 775. In some embodiments, the criteria 770 corresponds to interference criteria indicating when or whether collaborative and/or non-collaborative geolocation processes are appropriate (e.g., a maximum amount of interference, a minimum carrier-to-noise ratio, a minimum HPE, and the like). The historical data 775 can generally correspond to the historical interference experienced by the geolocation component 755 and/or by one or more neighbor APs. For example, the historical data 775 may indicate the average, maximum, or minimum carrier-to-noise ratio experienced by the geolocation component 755 (e.g., over a defined window of time), the number of geolocation operations or percentage of geolocation operations that required collaborative or non-collaborative mitigation to be completed, and the like. Although depicted as residing in storage 715, the criteria 770 and historical data 775 may be stored in any suitable location, including memory 710.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
providing, by an access point (AP), a wireless local area network (WLAN) using a first radio;
determining to initiate a geolocation process for the AP using a second radio;
determining a first amount of interference at the second radio caused by the first radio;
selecting a geolocation acquisition process comprising either a hot start geolocation acquisition process or a cold start geolocation acquisition process for the AP based on comparing the first amount of interference to one or more criteria; and
performing geolocation acquisition using the selected geolocation acquisition process.

2. The method of claim 1, further comprising:
determining a second amount of interference to the second radio at a first time, wherein the first amount of interference was determined at a second time prior to the first time; and
in response to determining that the second amount of interference satisfies the one or more criteria, initiating a hot start geolocation acquisition process for the AP.

3. The method of claim 1, further comprising:
monitoring, during a geolocation tracking process for the AP, ongoing interference amounts to the second radio; and
in response to determining that the ongoing interference amounts satisfy the one or more criteria, initiating a hot reset geolocation acquisition process for the AP.

4. The method of claim 3, wherein determining the ongoing interference amounts comprises:
monitoring a carrier-to-noise power density on the second radio;
monitoring utilization on the first radio; and
determining that the carrier-to-noise power density is correlated with the utilization.

5. The method of claim 1, wherein determining that the first amount of interference satisfies the one or more criteria comprises determining that the first amount of interference exceeds a threshold amount of interference, as compared to a historical amount of interference for the second radio.

6. The method of claim 1, further comprising performing an adaptive power management operation for the first radio, comprising:
reducing a transmission power of the first radio by a defined amount;
increasing a beamwidth of the first radio to compensate for the reduced transmission power; and
determining a second amount of interference to the second radio and caused by the first radio at the reduced transmission power.

7. The method of claim 6, further comprising, in response to determining that the second amount of interference satisfies the one or more criteria, further reducing the transmission power of the first radio by the defined amount.

8. The method of claim 6, further comprising:
determining that the first amount of interference has satisfied the one or more criteria for at least a threshold duration of time; and
determining to perform the adaptive power management operation in response to determining that the first amount of interference has satisfied the one or more criteria for at least the threshold duration of time.

9. The method of claim 1, further comprising:
determining a utilization of the first radio;
sorting a list of candidate APs based on historical interference information; and
in response to determining that the utilization satisfies the one or more criteria, steering one or more clients of the AP to one or more candidate APs, based on the sorted list of candidate APs.

10. A non-transitory computer-readable medium containing computer program code that, when executed by operation of one or more computer processors, performs an operation comprising:
providing, by an access point (AP), a wireless local area network (WLAN) using a first radio;
determining to initiate a geolocation process for the AP using a second radio;
determining a first amount of interference at the second radio caused by the first radio; and
selecting a geolocation acquisition process comprising either a hot start geolocation acquisition process or a cold start geolocation acquisition process for the AP based on comparing the first amount of interference to one or more criteria; and
performing geolocation acquisition using the selected geolocation acquisition process.

11. The non-transitory computer-readable medium of claim 10, the operation further comprising:
determining a second amount of interference to the second radio at a first time, wherein the first amount of interference was determined at a second time prior to the first time; and
in response to determining that the second amount of interference satisfies the one or more criteria, initiating a hot start geolocation acquisition process for the AP.

12. The non-transitory computer-readable medium of claim 10, the operation further comprising:
monitoring, during a geolocation tracking process for the AP, ongoing interference amounts to the second radio; and
in response to determining that the ongoing interference amounts satisfy the one or more criteria, initiating a hot reset geolocation acquisition process for the AP.

13. The non-transitory computer-readable medium of claim 10, the operation further comprising performing an adaptive power management operation for the first radio, comprising:
reducing a transmission power of the first radio by a defined amount;
increasing a beamwidth of the first radio to compensate for the reduced transmission power; and
determining a second amount of interference to the second radio and caused by the first radio at the reduced transmission power.

14. The non-transitory computer-readable medium of claim 13, the operation further comprising, in response to determining that the second amount of interference satisfies the one or more criteria, further reducing the transmission power of the first radio by the defined amount.

15. The non-transitory computer-readable medium of claim 10, the operation further comprising:
- determining a utilization of the first radio;
- sorting a list of candidate APs based on historical interference information; and
- in response to determining that the utilization satisfies the one or more criteria, steering one or more clients of the AP to one or more candidate APs, based on the sorted list of candidate APs.

16. A system, comprising:
- one or more computer processors; and
- a memory containing a program which when executed by the one or more computer processors performs an operation, the operation comprising:
  - providing, by an access point (AP), a wireless local area network (WLAN) using a first radio;
  - determining to initiate a geolocation process for the AP using a second radio;
  - determining a first amount of interference at the second radio caused by the first radio; and
  - selecting a geolocation acquisition process comprising either a hot start geolocation acquisition process or a cold start geolocation acquisition process for the AP based on comparing the first amount of interference to one or more criteria; and
  - performing geolocation acquisition using the selected geolocation acquisition process.

17. The system of claim 16, the operation further comprising:
- determining a second amount of interference to the second radio at a first time, wherein the first amount of interference was determined at a second time prior to the first time; and
- in response to determining that the second amount of interference satisfies the one or more criteria, initiating a hot start geolocation acquisition process for the AP.

18. The system of claim 16, the operation further comprising:
- monitoring, during a geolocation tracking process for the AP, ongoing interference amounts to the second radio; and
- in response to determining that the ongoing interference amounts satisfy the one or more criteria, initiating a hot reset geolocation acquisition process for the AP.

19. The system of claim 16, the operation further comprising performing an adaptive power management operation for the first radio, comprising:
- reducing a transmission power of the first radio by a defined amount;
- increasing a beamwidth of the first radio to compensate for the reduced transmission power; and
- determining a second amount of interference to the second radio and caused by the first radio at the reduced transmission power.

20. The system of claim 16, the operation further comprising:
- determining a utilization of the first radio;
- sorting a list of candidate APs based on historical interference information; and
- in response to determining that the utilization satisfies the one or more criteria, steering one or more clients of the AP to one or more candidate APs, based on the sorted list of candidate APs.

* * * * *